United States Patent
Musick et al.

(10) Patent No.: US 9,416,246 B2
(45) Date of Patent: Aug. 16, 2016

(54) PROCESS FOR CONTROLLING PARTICLE SIZE AND SILICA COVERAGE IN THE PREPARATION OF TITANIUM DIOXIDE

(75) Inventors: Charles David Musick, Waverly, TN (US); Robert A Johns, Kennett Square, PA (US); Joseph J Zaher, Newark, DE (US)

(73) Assignee: THE CHEMOURS COMPANY TT, LLC, Harrisburgh, PA (US)

( * ) Notice: Subject to any disclaimer, the term of this patent is extended or adjusted under 35 U.S.C. 154(b) by 604 days.

(21) Appl. No.: 13/978,271

(22) PCT Filed: Jan. 6, 2012

(86) PCT No.: PCT/US2012/020460
§ 371 (c)(1),
(2), (4) Date: Jul. 3, 2013

(87) PCT Pub. No.: WO2012/096837
PCT Pub. Date: Jul. 19, 2012

(65) Prior Publication Data
US 2013/0276671 A1    Oct. 24, 2013

Related U.S. Application Data

(60) Provisional application No. 61/431,137, filed on Jan. 10, 2011.

(51) Int. Cl.
*C08K 3/22* (2006.01)
*C01G 23/07* (2006.01)
*C09C 1/36* (2006.01)

(52) U.S. Cl.
CPC . *C08K 3/22* (2013.01); *C01G 23/07* (2013.01); *C09C 1/3653* (2013.01); *C01P 2002/52* (2013.01); *C01P 2004/51* (2013.01); *C01P 2004/84* (2013.01)

(58) Field of Classification Search
None
See application file for complete search history.

(56) References Cited

U.S. PATENT DOCUMENTS

| | | | |
|---|---|---|---|
| 2,488,439 A | 11/1949 | Schaumann | |
| 2,488,440 A | 11/1949 | Schaumann | |
| 2,559,638 A | 7/1951 | Krchma et al. | |
| 2,721,626 A | 10/1955 | Rick | |
| 5,562,764 A | 10/1996 | Gonzalez | |
| 2005/0119398 A1* | 6/2005 | Zhang | B01J 19/088 524/497 |
| 2006/0127303 A1 | 6/2006 | Subramanian et al. | |
| 2007/0172414 A1* | 7/2007 | Subramanian | C01G 23/07 423/613 |
| 2009/0148605 A1* | 6/2009 | Akhtar | B82Y 30/00 427/299 |

FOREIGN PATENT DOCUMENTS

| | | |
|---|---|---|
| EP | 0767759 B1 | 8/2000 |
| WO | 01/81480 A2 | 11/2001 |

OTHER PUBLICATIONS

International Search Report, PCT/US2012/020460, Dated Mar. 28, 2012.

* cited by examiner

*Primary Examiner* — Shamim Ahmed
*Assistant Examiner* — Bradford Gates

(57) ABSTRACT

The present disclosure relates to a vapor phase process for producing a substantially anatase-free titanium dioxide pigment comprising reacting a vaporous titanium dioxide precursor and an oxygen containing gas in a reactor; and introducing a mixture of liquid silicon halide and liquid titanium dioxide precursor into the reactor at a point downstream of the addition of the vaporous titanium dioxide precursor, and the oxygen containing gas, and at a process temperature of about 1200° C. to about 1600° C. to produce titanium dioxide particles that are substantially encapsulated in silicon dioxide.

15 Claims, No Drawings

PROCESS FOR CONTROLLING PARTICLE SIZE AND SILICA COVERAGE IN THE PREPARATION OF TITANIUM DIOXIDE

BACKGROUND OF THE DISCLOSURE

The present disclosure relates to the chloride process for the production of titanium dioxide pigment. This disclosure provides a route to a durable grade pigment, without the necessity of depositing surface treatments on the titanium dioxide particles by wet treatment.

Typically titanium dioxide particles may be produced by either the chloride or the sulfate process. In the chloride process, typically titanium dioxide is prepared by reacting titanium tetrachloride ($TiCl_4$) with oxygen. This reaction occurs at temperatures of about 1200° C. to about 1600° C. The pigment properties of the so prepared titanium dioxide particles may then be modified to optimize the pigment properties of dispersion, optical spacing or durability by processing in one or more wet treatment operations to deposit metal oxides on the surface of the pigment. Deposits of aluminum oxide or combinations of aluminum oxide and silicon dioxide, used alone or in combination with other oxides, are typical constituents of commercial titanium dioxide pigment. Such surface treatments are deposited through precipitation of the desired metal oxide in a wet chemical reaction. Thus, the base pigment, that is, the titanium dioxide particles produced at the exit point of the oxidizer in the chloride process or after calcination in the sulfate process, must be washed and processed through one or more wet treatment steps. Wet treatment is then followed by washing, drying and grinding to produce a product suitable for use in for example, exterior coatings and plastics or paper products. The silicon dioxide added via wet chemistry requires additional grinding energy to obtain the desired finished product properties.

A process is needed that effectively coats titanium dioxide particles with silica to produce durable, non-yellowing substantially anatase-free titanium dioxide particles, having smaller particle size, while not requiring additional operating or equipment costs.

SUMMARY OF THE DISCLOSURE

The present disclosure provides a vapor phase process for producing a substantially anatase-free titanium dioxide comprising:

(a) reacting a vaporous titanium dioxide precursor and an oxygen containing gas in a reactor; and (b) introducing a mixture of liquid silicon halide and liquid titanium dioxide precursor into the reactor at a point downstream of the addition of the vaporous titanium dioxide precursor, and the oxygen containing gas, and at a process temperature of about 1200° C. to about 1600° C. to produce titanium dioxide particles that are substantially encapsulated in silicon dioxide and having a smaller particle size distribution.

By 'substantially encapsulated' we mean the titanium dioxide particle is predominately covered with a layer of silicon dioxide. Typically, the silicon dioxide layer is pyrogenically deposited.

By 'substantially anatase-free titanium dioxide' we mean titanium dioxide with less than about 0.7% anatase formation, more typically less than about 0.5% of anatase formation, and most typically less than about 0.2% of anatase formation.

The titanium dioxide precursor may be titanium tetrahalide or titanium alkoxides. More typically the titanium tetrahalide is titanium tetrachloride. The oxygen containing gas may be oxygen or air or oxygen enriched air.

It is also typical that the silicon halide, typically silicon tetrachloride, is introduced in an amount sufficient to provide a silicon dioxide content of about at least 1.0% by weight. Optionally aluminum halide, typically aluminum trichloride, can be added to the vaporous titanium dioxide precursor in an amount sufficient to provide an aluminum oxide content of finished pigment of at least about 1% by weight. The ratio of the liquid silicon halide to liquid titanium dioxide precursor in the mixture is about 1:1 to about 1:50, more typically about 1:2 to about 1:30, and most typically about 1:5 to about 1:10.

The present disclosure also provides a durable titanium dioxide pigment substantially encapsulated in silicon dioxide wherein at least 75% of the pigment particles are completely covered by a layer of amorphous silicon dioxide, the pigment produced by:

(a) reacting a vaporous titanium dioxide precursor and an oxygen containing gas in a reactor; and (b) introducing a mixture of liquid silicon halide and liquid titanium dioxide precursor into the reactor at a point downstream of the addition of the vaporous titanium dioxide precursor, and the oxygen containing gas, and at a process temperature of about 1200° C. to about 1600° C.

DETAILED DESCRIPTION OF THE DISCLOSURE

The production of titanium dioxide, $TiO_2$, by vapor phase oxidation of titanium tetrachloride, $TiCl_4$, is well known and described in U.S. Pat. Nos. 2,488,439 and 2,559,638, the teachings of which are incorporated herein by reference. The present disclosure relates to improvements in the aforementioned processes.

The substantially anatase-free titanium dioxide formed is durable meaning a pigment particularly suitable for exterior architectural coatings and automotive refinish or color coat/clear coat OEM finishes. These pigments also have application in the paper and polymer composites industries. Generally such pigments are characterized in that no more than about 25% of the pigment dissolves in sulfuric acid in the acid solubility test as described below, and that silicon dioxide represents at least 1 to 4% of the total weight of the pigment.

The composition of the oxide treatment deposited by the process of the present disclosure may be amorphous silicon dioxide or may be a mixture of amorphous aluminum oxide and amorphous silicon dioxide. The thickness of the treatment layer deposited in the present disclosure is typically not more than about 5 nm, more typically about 1 to about 5 nm, and most typically about 1 to about 2.5 nm. The pigment is typically more than 99% rutile.

The treatment on the surface of these particles can be seen to be complete and uniform. It is believed that the uniformity and the completeness of the surface treatment layer in the present pigments results in acid solubilities of less that 25% even at silica concentrations as low as 1% by weight of the total pigment. Further, both crystal size (carbon black undertone) and agglomerates (coarse tail) are improved in these pigments prepared by the process of this disclosure.

Full, complete coverage of the particles means that the entire surface of the titanium dioxide particle is covered with the layer of surface treatment. The product of the present disclosure is characterized by the fact that at least 75% of the particles are fully and completely covered by a layer of surface treatment. This layer is thin and uniform. The thickness of the layer is about 1 nm to about 5 nm for silicon dioxide on the titanium dioxide particles at $SiO_2$ addition amounts of 1-2%. Higher concentrations of the surface treatment are expected to produce thicker layers, but at equal uniformity.

In comparison to the present disclosure, wet treatment processes deposit silicon dioxide and aluminum oxide on to the surface of the pigment particle by precipitation. Wet treatment processes typically produce silica debris, crystalline aluminum oxide, and irregular particle surfaces. Crystalline oxides typical of wet treatments are not found in the product of the present disclosure.

Elimination of wet treatment offers an advantage in the overall titanium dioxide manufacturing process in reducing processing steps and thereby cost of manufacture. New treatment compositions offer the potential to produce pigments having improved processing characteristics and properties.

In contrast to pigments produced by wet treatment processes, the pigment of the present disclosure is free of debris. This lack of debris may contribute to improved dispersion and improved performance in coatings and plastics. Since the silicon dioxide is deposited pyrogenically, the absence of moisture on the surface that is present with the wet treatment process is beneficial to thin film plastics applications.

Although pigment durability can be achieved at levels of silicon dioxide of about 1% by weight of the pigment, higher levels of silicon dioxide and of aluminum oxide may be deposited on the surface of a pigment of the present process. Also other oxides may be deposited using the present process, and the pigment of the present disclosure may be treated with organic treatments as is known by one skilled in this art. Although a durable pigment is produced by the process of the present disclosure when at least 75% of the particles have a full, complete surface coverage, it is more typical that at least 85% of particles having full, complete surface coverage, and about 95% or more is even more typical.

In the present process, a titanium dioxide precursor, such as titanium halide or titanium alkoxide, is preheated to a temperature of from about 300 to 650° C. and optionally mixed with an aluminum halide, such as aluminum trichloride, forming a mix which is fed into a pre-heated stream of oxygen containing gas, more typically oxygen. Water tends to have a rutile promoting effect. It is typical that the reactants be hydrous. For example the oxygen containing gas may comprise hydrogen in the form of water and can range from about 0.01 to about 0.3 weight % of hydrogen, more typically about 0.02 to about 0.2% weight % of hydrogen, based on the $TiO_2$ produced. Optionally, the oxygen containing gas may also comprise a vaporized alkali metal salt to act as a nucleant. Some suitable alkali metal salts include inorganic potassium salts such as KCl, organic potassium salts, and cesium salts such as CsCl.

Some typical titanium halides include titanium tetrachloride or titanium trichloride. Some typical titanium alkoxides include titanium tetraisopropoxide, titanium tetraethoxide and titanium tetrabutoxide. This mix may contain other metal compounds, including low levels of silicon tetrachloride (<0.2% $SiO_2$). Some examples of other metal compounds used in the chloride pigment manufacture may include compounds of boron, phosphorous, zirconium, tungsten and others. The introduction of phosphorous compounds into the oxidizer is generally positioned to control corrosion and may be at some point down stream of the point where the titanium dioxide precursor and aluminum halide are introduced into the reactor. In addition to the aluminum halide, water vapor may be used in the titanium reaction. Optionally, a third compound such as boron or phosphorous could be mixed with the liquid silicon halide and titanium dioxide precursor. A mixture of both boron and phosphorous could also be added to the liquid mixture to provide a borophosphosilicate glass on the titanium dioxide surface.

The typical location for the addition of the aluminum halide is in a mixture with the titanium dioxide precursor.

In the process of the present disclosure, oxygen containing gas, typically oxygen, air or oxygen-enriched air is present as an initial reactant. Although it is typical to run the present process with the oxygen in excess of the amount required to oxidize the chloride mix, the process may be operated with the concentration equal to or less than the stoichiometric amount. The oxygen containing gas comprises oxygen, aft or oxygen-enriched aft.

The addition of the liquid mixture of silicon halide and the titanium dioxide precursor that may be similar to that discussed earlier may be made at a point in the reactor where the process temperature is 1200° C. to 1600° C., more typically about 1400° C. to about 1600° C., and still more typically about 1500° C. to about 1600° C. By 'liquid mixture' we mean both the silicon halide and the titanium dioxide precursor are in the liquid phase. The ratio of the liquid silicon halide to liquid titanium dioxide precursor in the mixture is about 1:1 to about 1:50, more typically about 1:2 to about 1:30, and most typically about 1:5 to about 1:10.

Suitable silicon halides include silicon tetrachloride, $SiCl_4$, $SiBr_4$, $SiI_4$, and more typically silicon tetrachloride, $SiCl_4$. Often, the point or points of addition will not exceed the downstream distance traveled by the reactants or reaction products by about 0.002 to about 2 seconds, more typically 0.005 to about 0.3 seconds, after the initial contact of the reactants. Alternately, the point of $SiCl_4$ addition may be determined as the minimum length of about 3 to about 6 diameters of the flue after the $TiCl_4$ and oxygen are initially contacted. At these points of addition typically at least 90% of the titanium tetrachloride, more typically 95% of the titanium tetrachloride has been converted to titanium dioxide. That is, the point where not more than 10% of the initial titanium tetrachloride charge remains unreacted.

The advantage of mixing the liquid silicon halide and liquid titanium dioxide precursor together is believed to be the generation of additional turbulence at the location where the liquid titanium dioxide precursor is added. This additional turbulence is expected to enhance the mixing of the silicon halide throughout the reactor discharge prior to conversion to silicon dioxide which provides better coverage of the TiO2 particles. By using the liquid titanium dioxide precursor instead of another liquid, there is no added inert load to the downstream equipment as the liquid titanium dioxide precursor also generates $TiO_2$.

Some reactors useful in this process for the preparation of the titanium dioxide particles include aerosol flame reactors and plasma flame reactors.

Process temperatures range from about 1200° C. to about 1600° C., more typically about 1400° C. to about 1600° C., and still more typically about 1500° C. to about 1600° C. Pressures range from about 5 to about 100 psig, more typically about 15 to about 70 psig. It is believed that higher temperatures and pressures also assist in achieving rutile formation.

The reaction product containing a suspension of titanium dioxide particles in a mixture of chlorine and residual gases is carried from the reaction zone at temperatures considerably in excess of 1200° C. and is then subjected to fast cooling in the flue. The cooling can be accomplished by any conventional means known to one skilled in the art. In one embodiment, scouring particles or scrubs can be typically added downstream or at the addition of the $SiCl_4$ to minimize the buildup of titanium dioxide particles on the interior of the flue during cooling. This is described in greater detail in U.S. Pat. No. 2,721,626, the teachings of which are incorporated herein by reference.

The titanium dioxide particles recovered from the cooled reaction products may undergo conventional separation techniques. Some such techniques include cyclonic or electrostatic separation, filtration through porous media, etc. The recovered titanium dioxide particles may then be subjected to further surface treatment, milling, grinding or disintegration treatment to obtain the desired level of agglomeration.

The titanium dioxide particles are tested for Carbon Black Undertone (CBU), a measure of particle size. It is believed that the higher the CBU, the smaller the particles. A typical CBU for $TiO_2$ used in paint is about 10. CBU is determined by mulling together a suitable liquid, such as light colored oil and standard weights of the sample and a standard carbon black. The mixture is spread with a standard mixture on a panel and the relative blueness of the gray mixtures was observed. Fine particles give a bluer undertone or higher CBU. CBU values may be determined by methods described in U.S. Pat. No. 2,488,440, the teachings of which are incorporated herein by reference, with exception that a rating of 10 versus 100 is typically used.

Typically, the substantially anatase-free titanium dioxide pigment has a carbon black undertone (CBU) of about 8 to about 25, more typically 9 to about 20, and most typically about 10 to about 18. The substantially anatase-free titanium dioxide pigment has a coarse tail particle size of about 5% to about 50%>1.0 um, more typically 10% to about 40%>1.0 um, and most typically about 10% to about 25%>1.0 um for the production of a high gloss grade.

Particle size distribution of the pigment particles is measured by laser diffraction analysis, with a Horiba® LA-900 (Horiba Scientific, Kyoto, Japan) after dispersion in aqueous suspension by fixed level sonication. The particle size measurement of the oxidation base and the %>1.0 micron fraction will indicate the potential for peak gloss in the finished product, a value that cannot be exceeded while applying any reasonable energy level. In addition, less grinding energy is required for improving the quality of the oxidation base.

EXAMPLES

The present disclosure is further illustrated in the following examples. The testing with liquid SiCl4 co-fed with liquid TiCl4 showed a greater improvement in carbon black undertone (CBU), particle size, and acid solubility than by feeding liquid SiCl4 alone. These examples should not be construed as limiting the scope of the disclosure. All parts, percentages and proportions are by weight unless otherwise indicated.
Test Procedures:
Acid Solubility is determined as the amount of pigment that dissolves in hot concentrated sulfuric acid.

A small sample of pigment was placed in hot sulfuric acid (about 175° C.) and digested for an hour. The sample was then diluted with a measured amount of water and all particulate material was filtered out. A measured sample of the filtrate was then placed in a volumetric flask. Hydrogen peroxide was added to the flask to ensure all the titanium ions were in the proper oxidation state for their concentration to be determined spectrophotometrically at 400 nm. The flask was then filled to volume with 10% sulfuric acid. The absorbance was measured vs. a blank containing the same amount of hydrogen peroxide as was added to the sample in 10% sulfuric acid. The percent of titanium dioxide was read from a calibration curve prepared from known standards.

Comparative Example 1

$SiCl_4$ was fed to the reactor as a finely dispersed liquid at a location 5 feet (1.5 meters) downstream (or about 0.02-0.04 seconds from the point at which the $TiCl_4$ and oxygen are initially contacted) at a rate and at an amount sufficient to provide a loading of 2.2% by weight $SiO_2$ based on the total solids formed in the oxidation reaction as described in U.S. Pat. No. 5,562,764. The $SiCl_4$ was atomized with 60 scfm of nitrogen. The $TiCl_4$ temperature was 435° C. and the oxygen temperature was 1540° C. for the test conditions. The estimated temperature of the reaction mass at the point of $SiCl_4$ injection was about 1400° to 1500° C. for the reaction zone at a pressure of 43 psig. The production rate was 10.0 tons/hr. The CBU improved from 11.4 to 14.6. The percent of particles >1.0 microns was also found to decrease from 16% without the addition of $SiCl_4$ to the process to 8% with the added $SiCl_4$. The acid solubility without $SiCl_4$ was 36% which fell to 31% with the addition for $SiCl_4$.

Example 1

$SiCl_4$ was mixed with liquid $TiCl_4$ at a ratio of about 1:6 and fed to the reactor as a finely dispersed liquid at a location 5 feet (1.5 meters) downstream (or about 0.02-0.04 seconds from the point at which the $TiCl_4$ and oxygen are initially contacted) at an amount sufficient to provide a loading of 2.2% by weight $SiO_2$ based on the total solids formed in the oxidation reaction. The $TiCl_4$ temperature is 425° C. and the oxygen temperature is 1540° C. for the test conditions. The mixture of $SiCl_4$ and $TiCl_4$ are introduced into the reactor at a temperature of 30 C where both $SiCl_4$ and $TiCl_4$ are liquids. The $SiCl_4/TiCl_4$ mixture was atomized with 60 scfm of nitrogen. The estimated temperature of the reaction mass at the point of $SiCl_4$ injection is about 1400° to 1500° C. for the reaction zone at a pressure of about 43 psig. The production rate was 10 tons/hr with 10% of the total $TiCl_4$ fed to the reactor as liquid. The CBU increased from 11.4 with liquid $TiCl_4$ only being added to 15.1 with a mixture of liquid $TiCl_4$ and liquid $SiCl_4$. The percent of particles >1.0 microns decreased with the added $SiCl_4$ from 16% to 7%. The acid solubility without $SiCl_4$ was 36% which fell to 25% with the addition of the $SiCl_4/TiCl_4$ mixture. No anatase was detected in either sample.

TABLE 1

| Example | Percentage of total TiCl4 Feed as Liquid | Percentage of SiCl4 Fed to Reactor | CBU | Acid Solubility | % >1.0 um |
| --- | --- | --- | --- | --- | --- |
| Comparative Example 1 | 0% | 0% | 11.4 | 36% | 16% |
|  | 0% | 2.2% | 14.6 | 31% | 8% |
| Example 1 | 10% | 0% | 11.4 | 36% | 16% |
|  | 10% | 2.2% | 15.1 | 25% | 7% |

What is claimed is:
1. A vapor phase process for producing a substantially anatase-free titanium dioxide pigment comprising:
  (a) reacting a vaporous titanium dioxide precursor and an oxygen containing gas in a reactor; and
  (b) introducing a mixture of liquid silicon halide liquid titanium dioxide precursor into the reactor at a point downstream of the addition of the vaporous titanium dioxide precursor, and the oxygen containing gas, and at a process temperature of about 1200° C. to about 1600° C. to produce titanium dioxide particles that are substantially encapsulated in silicon dioxide.

2. The process of claim 1 wherein the titanium dioxide comprises less than about 0.7% anatase.

3. The process of claim 1 wherein the titanium dioxide precursor is titanium tetrachloride, $TiCl_4$.

4. The process of claim 1 wherein the liquid silicon halide is $SiCl_4$, $SiBr_4$, or $SiI_4$.

5. The process of claim 1 wherein the liquid silicon halide is introduced in an amount sufficient to provide a silicon dioxide content of about at least 1.0% by weight, based on the total weight of the pigment.

6. The process of claim 1 wherein an aluminum halide is added in step (a) along with the vaporous titanium dioxide precursor.

7. The process of claim 1 wherein the mixture of liquid silicon halide and liquid titanium dioxide precursor is a mixture of liquid $SiCl_4$ and liquid $TiCl_4$, and the mixture is added at a point in the reactor with a process temperature of about 1400° C. to about 1600° C.

8. The process of claim 1 wherein the mixture of liquid silicon halide and liquid titanium dioxide precursor is a mixture of liquid $SiCl_4$ and liquid $TiCl_4$, and the ratio of liquid $SiCl_4$ and liquid $TiCl_4$ in the mixture is about 1:1 to about 1:50.

9. The process of claim 1 wherein an additional compound is mixed with the liquid silicon halide and liquid titanium dioxide precursor.

10. The process of claim 9 wherein the additional compound comprises at least one halide of boron, phosphorous, zirconium, tungsten, aluminum, zinc, sodium, calcium, or magnesium.

11. The process of claim 10 wherein the additional compound comprises a halide of boron or phosphorous, or mixtures thereof.

12. The process of claim 1 wherein the substantially anatase-free titanium dioxide from step (b) has an acid solubility of less than about 25% at a silicon dioxide concentration of about 1% by weight, based on the total weight of the pigment.

13. The process of claim 1 wherein the substantially anatase-free titanium dioxide pigment from step (b) has a carbon black undertone (CBU) of about 8 to about 25.

14. The process of claim 1 wherein the substantially anatase-free titanium dioxide pigment from step (b) has a coarse tail particle size of about 5 to about 25%>1.0 um.

15. A durable titanium dioxide pigment substantially encapsulated in silicon dioxide wherein at least 75% of the pigment particles are completely covered by a layer of amorphous silicon dioxide, the pigment produced by:
(a) reacting a vaporous titanium dioxide precursor and an oxygen containing gas in a reactor; and
(b) introducing a mixture of liquid silicon halide and liquid titanium dioxide precursor into the reactor at a point downstream of the addition of the vaporous titanium dioxide precursor, and the oxygen containing gas, and at a process temperature of about 1200° C. to about 1600° C.

* * * * *